United States Patent [19]
Miller et al.

[11] 3,867,510
[45] Feb. 18, 1975

[54] PROCESS FOR RECOVERING URANIUM AND PLUTONIUM FROM IRRADIATED NUCLEAR FUEL OXIDES

[75] Inventors: William E. Miller, Naperville; John F. Lenc, Westchester; Irvin O. Winsch, Downers Grove, all of Ill.

[73] Assignee: The United States of America as represented by the United States Atomic Energy Commission, Washington, D.C.

[22] Filed: Apr. 23, 1973

[21] Appl. No.: 353,255

[52] U.S. Cl........ 423/251, 75/84.1 A, 252/301.1 R, 423/4, 423/11, 423/254
[51] Int. Cl............................................ C01g 56/00
[58] Field of Search............. 252/302.1 R, 302.1 W; 423/4, 11, 19, 254, 251; 75/84.1 R, 84.1 A

[56] References Cited
UNITED STATES PATENTS
3,510,434  5/1970  Weber et al. .................. 423/251 X

OTHER PUBLICATIONS
Lenc, J. F. et al. ANL – 7503. Retorting Unit for Recovering of Uranium from Zinc – Magnesium Solutions, Apr. 1969. Available CFSTI.
Bernstein, G. J. et al. ANL-7772. The EBR-II Skull Reclamation Process. Part V. Design and Development of Plant Scale Equipment. Jan. 1971, Available NTIS.

Primary Examiner—Benjamin R. Padgett
Assistant Examiner—R. E. Schafer
Attorney, Agent, or Firm—John A. Horan; Arthur A. Churm; John L. Isaac

[57] ABSTRACT

This invention relates to a process for recovering uranium and plutonium from liquid-metal-cooled nuclear reactor irradiated fuel assemblies as well as a process for preparing uranium nitride, plutonium nitride and mixed uranium - plutonium nitride reactor fuels. The fuel oxides are separated from the fuel assemblies and reduced in a liquid-metal reduction solvent, thereby forming uranium and plutonium metal dissolved therein. This solvent is then contacted by a bed of particulate calcium nitride or magnesium nitride to react the dissolved uranium and plutonium with the particulate nitride to form insoluble particles of uranium nitride, plutonium nitride, and uranium - plutonium nitride mixtures. The bed of reacted particles is then removed from the solvent and retorted to remove any remaining liquid solvent and to volatilize any unconverted calcium nitride or magnesium nitride. This results in recovering the uranium and plutonium in the form of uranium nitride, plutonium nitride and uranium - plutonium nitride mixtures.

14 Claims, 6 Drawing Figures

PROCESS FOR RECOVERING URANIUM AND PLUTONIUM FROM IRRADIATED NUCLEAR FUEL OXIDES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to nuclear reactor fuel reprocessing and more particularly to the pyrochemical reprocessing of irradiated liquid-metal-cooled nuclear reactor fuels. Specifically, this invention relates to a process for recovering uranium and plutonium from irradiated fuel oxides in the head-end portion of a pyrochemical reprocessing system for LMFBR short-cooled fuel assemblies as well as to a process for preparing UN, PuN and UN-PuN nuclear reactor fuels.

Pyrochemical reprocessing techniques for spent nuclear fuel involve high-temperature chemical reactions, often with molten metals and salts. Because pyrochemical separation processes require comparatively small volumes of reagents, utilize few separate process steps, and produce solid, low-volume waste, intensive development work is in progress to produce a process adaptable to industrial requirements. A number of patents deal generally with pyrochemical methods for fissionable materials separation, a few of such being U.S. Pat. Nos. 3,282,681, 3,284,190, and 3,326,673.

Due to the high priority placed on the development of liquid-metal-cooled breeder reactors, a considerable developmental effort is being pursued to develop new pyrochemical procedures and processes for reprocessing the nuclear fuel elements from such reactors. Such new processes are highly desirable because of the high plutonium content of such fuel as well as the fact that pyrochemical processes are ideally suited to handling short-cooled fuels which have high decay heat generation rates and high levels of $I^{131}$. In the head-end portion of such a reprocessing system, the nuclear fuel assemblies are first declad, such decladding being achieved by dissolution of the assemblies in a pool of molten metal, such as zinc, at about 750° to 800°C. Overlying the molten metal in this decladding operation is a layer of molten salt that reacts with and traps fission product iodine liberated during decladding. When stainless steel dissolution is complete, the liquid metal solvent containing the stainless steel is separated from the oxide fuel pellets and salt, thereby achieving decladding. U.S. Pat. No. 3,567,648 illustrates such a decladding method.

For the next head-end step, another cover salt and a liquid-metal reduction solvent, such as a zinc-magnesium-calcium alloy, are added to the separated fuel oxide. Upon agitation of the system at about 750°C. to 850°C., the fuel oxide is reduced to metal by the calcium, which is converted to calcium oxide and dissolved in the molten cover salt. The uranium-plutonium metal dissolves in the reduction solvent alloy, and the iodine and other fission products liberated during reduction are trapped in the molten salt. This molten metal containing the dissolved uranium-plutonium metal is then separated from the molten salt.

The last step in such a pyrochemical head-end process is the recovery of the dissolved uranium-plutonium metal product from the liquid-metal solvent. The uranium-plutonium product of this recovery step must be suitable for subsequent processing wherein additional fission-product decontamination is effected by aqueous solvent extraction performed later in the reprocessing system. Prior to the present invention, this recovery of the dissolved uranium-plutonium metal product from the liquid-metal solvent has been achieved by retorting or distilling the liquid-metal solvent to remove the volatiles from the uranium and plutonium. Such methods, however, have not been entirely satisfactory when viewed in terms of large-scale commercial applications, for the large heat level that such retorting processes would put on a remote processing cell makes it impractical from an engineering viewpoint. Also, a crucible suitable for containing the uranium-plutonium on the large scale required for a commercial operation would have to be quite large to retain the large volume of liquid-metal solvent as well as have an appropriate shape for criticality considerations due to the high plutonium concentrations, and such a crucible is unavailable.

The inventors, however, have developed a new approach toward recovering the dissolved uranium-plutonium product from the liquid-metal solvent in the head-end process. This approach involves the conversion of the uranium-plutonium solute in the liquid-metal solvent to insoluble nitrides by reaction with nitrogen in the form of a bed of particulate calcium nitride or magnesium nitride. The calcium nitride or magnesium nitride particles, preferably contained in a perforated basket, are immersed in the liquid-metal solvent containing the dissolved uranium and plutonium. Stirring of the solvent causes it to flow through the particle bed, and the uranium and plutonium interchange with the calcium or magnesium, which in turn goes into solution. This produces particles of uranium nitride, plutonium nitride and uranium - plutonium nitride mixtures, and retention of these particles within the basket facilitates their recovery from the solvent for further processing. In addition, if uncontaminated uranium and plutonium are dissolved in the liquid-metal solvent in lieu of contaminated uranium and plutonium from irradiated fuel assemblies, the resultant UN, PuN and UN-PuN particles are substantially pure and can be directly utilized as nitride reactor fuel.

Therefore, it is one object of the present invention to provide a process for recovering uranium and plutonium from liquid-metal-cooled nuclear reactor fuel assemblies.

It is another object of the present invention to provide a process for recovering uranium and plutonium from a liquid-metal reduction solvent in the head-end portion of a pyrochemical reprocessing system for liquid-metal-cooled nuclear reactor fuel.

It is finally an object of the present invention to provide a method for preparing reactor fuels comprising uranium mononitride, plutonium mononitride, and uranium - plutonium mononitride mixtures.

SUMMARY OF THE INVENTION

In the pyrochemical fuel reprocessing system for spent, short-cooled LMFBR fuel assemblies, the fuel assemblies are declad by dissolution in a liquid zinc melt with the plutonium and uranium oxides contained therein being separated and then reduced by subsequent contact with a molten zinc-magnesium-calcium reduction solvent. To recover the reduced uranium and plutonium metal dissolved in the molten solvent, a bed of particulate calcium nitride or magnesium nitride is immersed in the 750° to 800°C. solvent, the solvent being continually agitated so that it passes through the particle bed. The nitride bed remains immersed in the solvent for an effective period of time to react the uranium and plutonium with the nitride particles to form insoluble particles of uranium nitride plutonium nitride and uranium - plutonium nitride mixtures, the calcium or magnesium being retained in the liquid-metal solvent. After the effective contact period, the bed of reacted particles is removed from the liquid-metal solvent and then retorted at around 925°C. in order to remove any remaining solvent as well as to volatilize any unconverted calcium nitride or magnesium nitride. These recovered particles of UN, PuN and UN-PuN are then available for further reprocessing.

In addition, the present invention can be utilized to form uranium nitride, plutonium nitride and uranium - plutonium nitride nuclear reactor fuels. In this particular embodiment of the present invention, uncontaminated uranium, plutonium, or mixtures thereof are dissolved in a suitable liquid-metal solvent, such as zinc, zinc-magnesium or zinc-magnesium-calcium. Insoluble nitrides of uranium, plutonium, or uranium-plutonium mixtures are formed by reacting the dissolved uranium, plutonium or uranium-plutonium mixtures with a bed of calcium nitride or magnesium nitride particles, either contained in a perforated basket immersed in the liquid-metal solvent or added to the liquid-metal solvent in bulk form. Recovery of the insoluble nitride product is obtained by either retracting the perforated basket containing the product, vacuum-distilling off residual solvent metal and volatilizing unconverted calcium or magnesium nitrides, or if the perforated basket is not utilized, by vacuum-distilling off all of the solvent metal to recover the nonvolatile nitride product. As a result, substantially pure particles of uranium mononitride, plutonium mononitride, or uranuium - plutonium mononitride mixtures are obtained and can be directly utilized as nuclear reactor fuels.

DETAILED DESCRIPTION OF THE INVENTION

Figures 1, 3:
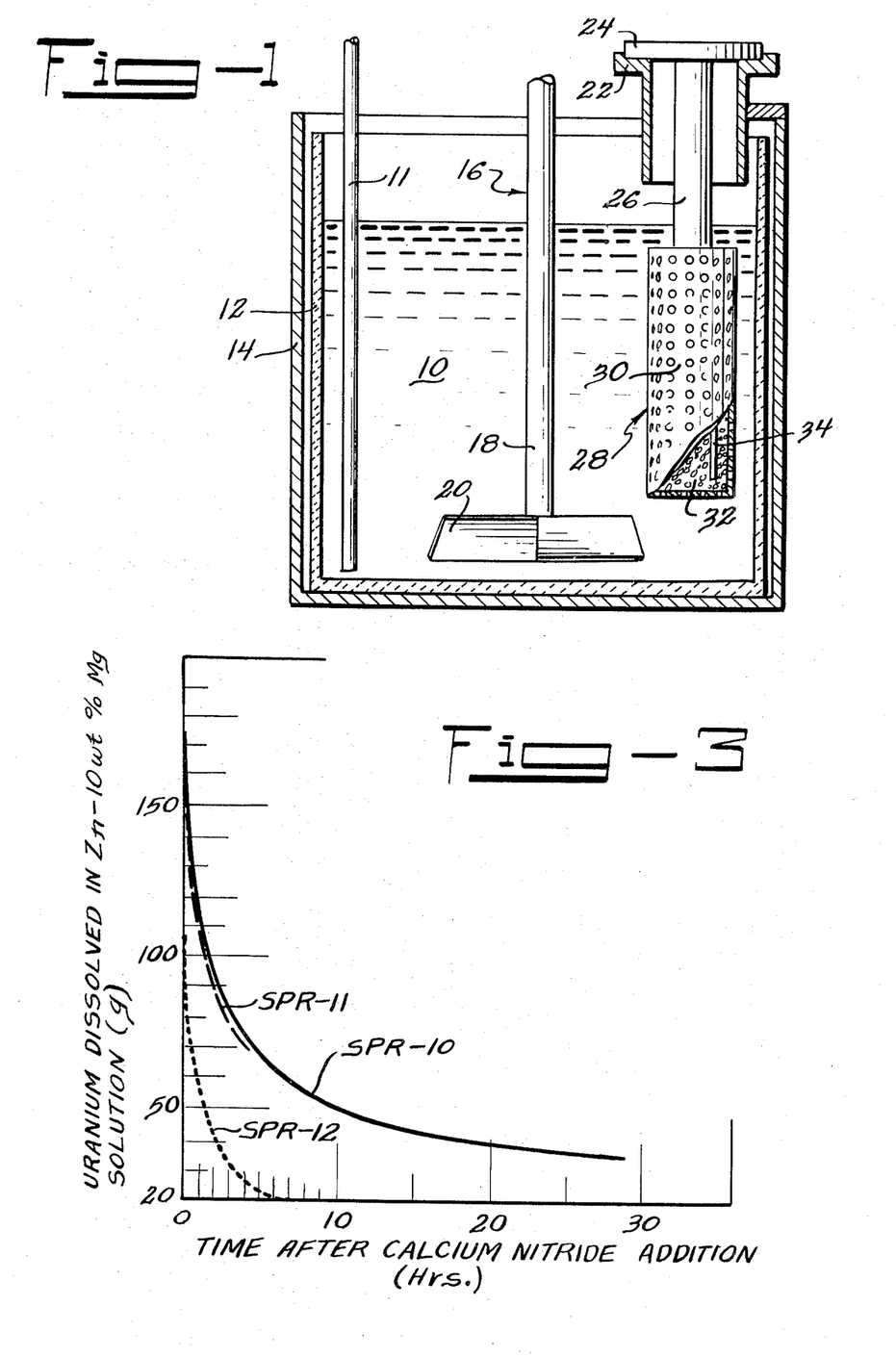
FIG. 1 is a schematic illustration of an apparatus designed to test the present invention.
FIG. 3 is a graph showing the amount of dissolved uranium remaining in a zinc-magnesium solvent versus the time after contact of the solvent with calcium nitride particles for three of the experimental runs of the present process.

Turning first to FIG. 1 which illustrates an apparatus designed to perform and test the present invention, a liquid-metal solvent 10 containing uranium and plutonium metal in solution is introduced through fluid transfer line 11 into cylindrical crucible 12 which in turn is located within vessel 14. Extending into solvent 10 at approximately the center of crucible 12 is a molybdenum - 30 wt. percent tungsten agitator 16 which comprises a vertical rotatable shaft 18 having two blades 20 attached at the end thereof about one-half inch above the bottom of crucible 12, blades 20 being pitched at about a 45° angle pushing downward. Attached to an upper portion of the wall of vessel 14 is a hollow, cylindrical flange holder 22. Removably attached to the top of flange holder 22 is a circular flange 24. Secured to the bottom center of flange 24 and extending vertically downward through the hollow interior of flange holder 22 is shaft 26, the end of which is attached to nitride particle bed 28. Nitride particle bed 28 consists of cylindrical perforated screen container 30, the interior of which contains a bed of nitride particles 32. In addition, bed heater 34 extends the length of the interior of container 30.

It should be noted that the apparatus illustrated in FIG. 1 and discussed in greater detail herein was utilized only for experimental purposes. Therefore, the present invention is not to be limited to this or any other such device.

Agitator 16 was utilized to mix solvent 10 so that it continually passed through perforated container 30 and contacted the bed of nitride particles 32. Perforated screen container 30 was made of 0.02-inch-thick tantalum with holes of 0.0625-inch and 0.052-inch diameter, the total percentage of open area of the lateral surface of container 30 being about 42 percent. The bed of nitride particles 32 comprised calcium nitride or magnesium nitride particles of −6 +10 mesh size with some being −10 +60 mesh. Generally, liquid-metal solvent 10 was agitated at about 500 rpm at a temperature of approximately 750°–800°C. under 15-psig argon pressure.

Figure 2:
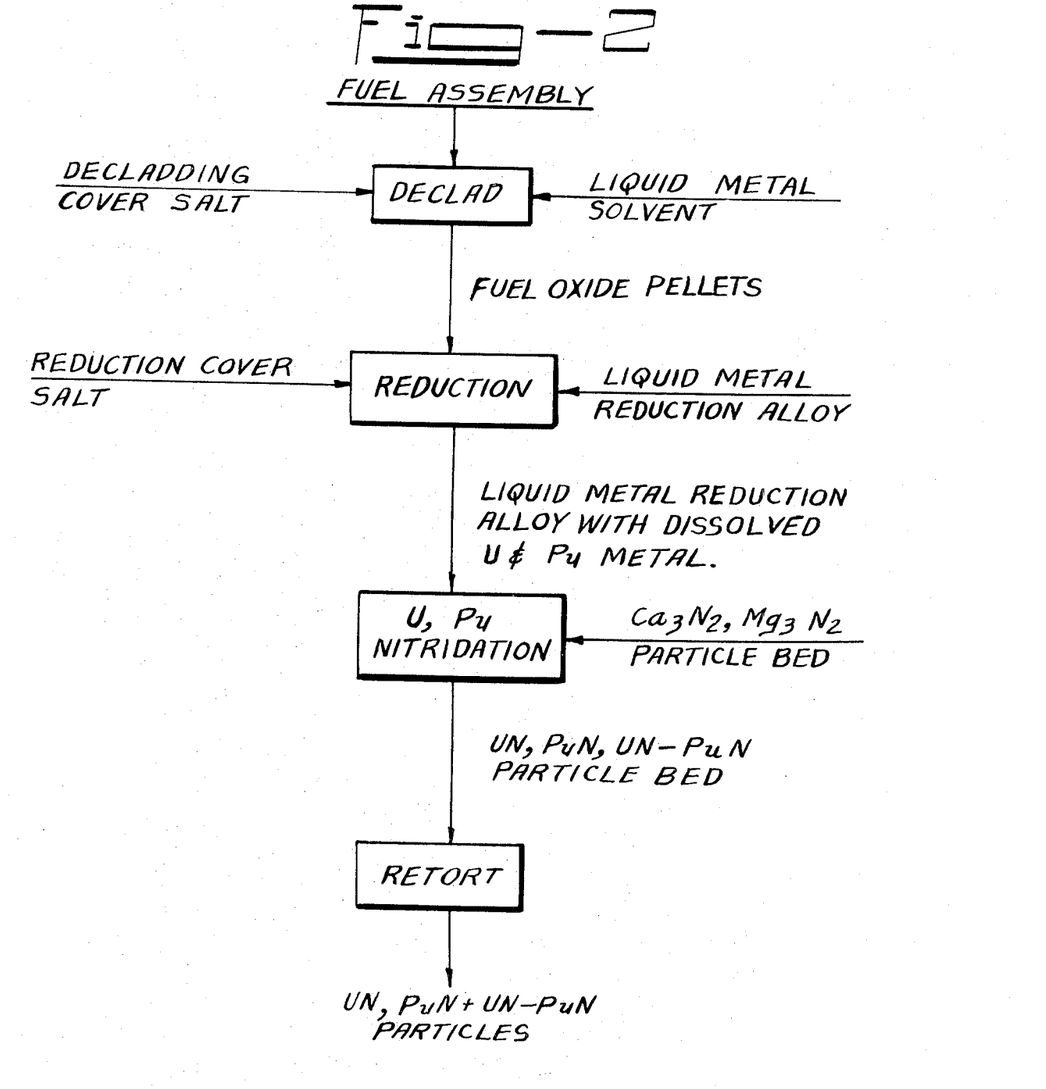
FIG. 2 is a general flow chart for the head-end process of a pyrochemical reprocessing system utilizing the present invention.

In order to more clearly understand the present invention, FIG. 2 illustrates a general flow chart for the head-end portion of the pyrochemical reprocessing system. It should be noted that FIG. 2 shows only those steps of particular interest to the present invention, omitting such items as waste streams, salt processing, etc. An irradiated LMFBR fuel assembly consisting of bundles of stainless steel tubes containing mixed uranium-plutonium oxide fuel pellets is first dissolved in a liquid-metal solvent melt such as molten zinc which is covered by a molten salt solution. The fuel oxide pellets remain intact, but the stainless steel components of the assembly dissolve in the melt with some fission products dissolving in the cover salt. The oxide pellets are then separated from the melt and placed in a liquid-metal reduction alloy such as zinc-magnesium or zinc-magnesium-calcium which is also covered by a molten cover salt. The fuel oxide pellets are reduced by the reduction alloy to uranium and plutonium metal which become dissolved therein. In addition, some fission products dissolve in the reduction alloy and others in the cover salt. The cover salt is then removed and the depleted reduction alloy brought up to full strength. The reduction alloy, containing the dissolved uranium and plutonium metal, is then brought into contact with calcium nitride or magnesium nitride particles, preferably in the form of a particle bed, for an effective period of time whereupon the uranium and plutonium dissolved in the alloy react with the nitride particles so as to form a bed of uranium nitride, plutonium nitride and mixed uranium - plutonium nitride particles. After the effective contact period, this bed of reacted particles is then removed from the reduction alloy and retorted.

To be useful in the head-end process, the present invention must appreciably reduce the uranium and plutonium contents of the reduction solution as well as lend itself to phase separation. The formation of insoluble uranium and plutonium nitrides meets such criteria, and calcium nitride was initially chosen for testing purposes rather than magnesium nitride because one of the reaction products, calcium, of the nitriding process using calcium nitride may also be utilized as a reducing agent for the fuel oxides in the reduction step. Consequently, use of calcium nitride has the potentiality of furnishing not only nitrogen for uranium and plutonium nitridation in the present product recovery process, but also calcium for the reduction step if the solvent alloy is to be recycled.

A series of experiments were performed in order to prove the feasibility and operability of the present invention as well as to determine the various parameters and embodiments involved therewith. In one such experiment, SPR-7, 100 grams of uranium metal were dissolved in a zinc-magnesium solvent comprising 8,800 grams of zinc and 1,000 grams of magnesium. After dissolution of the uranium, 104 grams of calcium nitride were added to the solvent in the form of bulk −60 mesh particles. It was felt that two reactions, shown below, between the calcium nitride and the uranium were possible, and it was one of the purposes of SPR-7 to determine which reaction, if any, would in fact occur. The 104 grams of calcium nitride added to the solvent was about 236 percent in excess of the stoichiometric amount required for reaction (1) and 122 percent in excess of that required for reaction (2).

$$Ca_3N_{2\,S} + 2\ U_{(Zn\text{-}10\ wt.\ \%\ Mg)} \rightarrow 2\ UN_{(S)} + 3\ Ca_{(Zn\text{-}10\ wt.\ \%\ Mg)} \quad (1)$$

$$3\ Ca_3N_{2\,S} + 4\ U_{(Zn\text{-}10\ wt.\ \%\ Mg)} \rightarrow 2\ U_2N_{3\,S} + 9\ Ca_{(Zn\text{-}10\ wt.\ \%\ Mg)} \quad (2)$$

The temperature of the solvent was maintained at about 800°C. with the solvent being agitated at about 500 rpm. Filtered samples of the solvent were obtained at various time intervals after calcium nitride addition in order to determine how much dissolved uranium remained in solution. The results of SPR-7 are shown in Table I, and from these results it was determined that 99.4 percent of the uranium in the zinc-magnesium solvent had reacted with the calcium nitride in less than four hours. In addition, X-ray diffraction analysis of retorted samples of the products recovered from SPR-7 indicated that the final particle product was virtually pure uranium mononitride, indicating thereby that it is reaction (1) which proceeds under these conditions.

TABLE I

| Time after $Ca_3N_2$ addition (hrs) | Uranium content in Zn-Mg solvent (wt. %) |
|---|---|
| 0 | 1.0 |
| 2 | 0.074 |
| 3.5 | 0.006 |
| 19.75 | 0.002 |
| 24.75 | 0.002 |

In the next four experiments, SPR-9 to 12, a zinc - 10 wt. percent magnesium solvent containing 1 to 1.5 wt. percent uranium was prepared. The formation of insoluble uranium nitride was then attempted by reacting the dissolved uranium with a bed of −8 + 10 mesh calcium nitride particles contained in a perforated tantalum basket. The temperature and agitation conditions were the same as for SPR-7. The procedure following removal of the converted particle bed was slightly different for SPR-9 than for SPR-10 to 12. The amount of uranium nitride retained in the basket in SPR-9 was determined by dissolving the basket contents in acid and analyzing a sample of the resultant solution for uranium. For SPR-10 to 12, the material retained in the basket was retorted at temperatures up to 925°C. to distill off residual zinc, magnesium and calcium. The retorted product was then analyzed by X-ray diffraction analysis to verify the presence of uranium nitride. In each of these experiments, filtered samples of the solvent were obtained at various intervals after the calcium nitride addition. From analyses of these samples, the weight of uranium in solution at various intervals after calcium nitride addition was calculated as well as the weight of calcium dissolved in the zinc-magnesium-uranium solution. These results are shown in Table II.

TABLE II

| Time after $Ca_3N_2$ Addition (hrs) | Wt. of U and Ca in solvent (g) | | | | | | |
|---|---|---|---|---|---|---|---|
| | SPR-9 U | SPR-10 U | Ca | SPR-11 U | Ca | SPR-12 U | Ca |
| 0 | 163 | 176 | 0.1 | 167 | 0.3 | 107 | 0.3 |
| 0.5 | | | | 117 | 35 | 69 | 45 |
| 1.0 | | | | 109 | 39 | 56 | 46 |
| 1.5 | | | | 99 | 38 | | |
| 2.0 | 95 | 96 | 38 | 94 | 41 | 41 | 48 |
| 3.0 | | | | 82 | 41 | 36 | 46 |
| 4.0 | 77 | 75 | 38 | | | 26 | 47 |
| 4.5 | | | | 70 | 43 | | |
| 6.0 | | 65 | 38 | | | 16 | 47 |
| 8.0 | | 57 | 38 | | | | |
| 10.0 | | 52 | 39 | | | | |
| 12.0 | | 48 | 38 | | | | |
| 16.0 | | 42 | 38 | | | | |
| 20.25 | 53 | | | | | | |
| 22.0 | | 39 | 38 | | | | |

TABLE II—Continued

| Time after Ca₃N₂ Addition (hrs) | Wt. of U and Ca in solvent (g) | | | | | | |
|---|---|---|---|---|---|---|---|
| | SPR-9 U | SPR-10 U | SPR-10 Ca | SPR-11 U | SPR-11 Ca | SPR-12 U | SPR-12 Ca |
| 23.0 | 45 | | | | | | |
| 25.5 | 42 | | | | | | |
| 26.0 | | 38 | 39 | | | | |
| 28.0 | 41 | | | | | | |
| 29.0 | | 36 | 39 | | | | |
| 44.5 | 36 | | | | | | |
| 48.5 | 36 | | | | | | |
| 51.75 | 33 | | | | | | |

In SPR-9 through 11, the amount of calcium nitride used was less than that required for complete conversion of the dissolved uranium to uranium mononitride particles. The purpose of these experiments was to determine the degree of conversion of the calcium nitride bed to insoluble uranium nitride while excess uranium was present. In SPR-12, the amount of nitrogen charged as calcium nitride was in excess of the amount to completely convert the dissolved uranium to uranium nitride, and the objective of SPR-12 was to determine how completely the uranium could be removed from solution as insoluble uranium nitride. FIG. 3 shows the weight of dissolved uranium in the zinc-magnesium solvent for SPR-10, 11 and 12 as a function of time after the calcium nitride addition.

For SPR-10 it was calculated that about 38 grams of calcium would enter the zinc-magnesium-uranium solution if the 47 grams of calcium nitride charged to the solution reacted completely with the uranium. This quantity of dissolved calcium was detected in samples taken early in the experiment as seen in Table II. However, the amounts of uranium that had been removed from solution at the time these samples were taken was significantly less than the amount that would have been removed by direct reaction of calcium nitride with dissolved uranium to form either uranium mononitride or uranium sesquinitride. From SPR-10, then, it was determined that the calcium nitride does not react directly with the uranium solute, but converts to an intermediate compound, and it was determined that this intermediate compound is magnesium nitride formed by the following reaction:

$$Ca_3N_{2\,S} + 3\ Mg_{(Zn-10\ wt.\ \%\ Mg)} \rightarrow Mg_3N_{2\,S} + 3\ Ca_{(Zn-10\ wt.\ \%\ Mg)} \quad (3)$$

The magnesium nitride thus formed subsequently reacts with the dissolved uranium to form uranium mononitride by the following reaction:

$$Mg_3N_{2\,S} + 2\ U_{(Zn-10\ wt.\ \%\ Mg)} \rightarrow 2\ UN_{(S)} + 3\ Mg_{(Zn-10\ wt.\ \%\ Mg)} \quad (4)$$

Therefore, it was determined from SPR-10 that in the present invention either calcium nitride particles can be utilized, in which case they are converted first to magnesium nitride particles which in turn react with the dissolved uranium, or magnesium nitride particles can be utilized which react directly with the dissolved uranium.

SPR-11 was similar to SPR-10 except that it was terminated after only 4½ hours of nitride bed contact. The results shown in Table II indicate that 55 percent of the available nitrogen charged as calcium nitride had reacted in this time period to form uranium mononitride. X-ray diffraction analysis of two samples from the outer edge of the bed of reacted and retorted particles from this experiment showed a major phase of uranium mononitride with no detectable minor phase. Similar analysis of two samples from the center of the particle bed showed that uranium mononitride was the major phase and that magnesium nitride was present as a minor phase. These results indicate that the outer edge of the bed was completely converted to uranium mononitride, but the center of the bed still contained some nitrogen as magnesium nitride that had not reacted with the uranium solute in the short 4½-hour contact time. Detection of the magnesium nitride in the center of the bed gave further proof that calcium nitride does not react directly with the uranium solute to form insoluble nitride but is first converted to the intermediate compound magnesium nitride.

SPR-12 was similar to SPR-11 except that an excess of nitrogen was charged as calcium nitride in order to convert more of the uranium solute to insoluble uranium nitride. The weight of the calcium nitride particles charged was 57 grams, about 42 percent in excess of that required to react all of the dissolved uranium. As is clear from FIG. 3 and Table II, the amount of dissolved uranium had been reduced from 107 grams to 16 grams after 6 hours of calcium nitride contact. Greater than 85 percent of the dissolved uranium, then, was converted to uranium nitride in only 6 hours. The 57 grams of calcium nitride originally immersed in the zinc-magnesium solvent contained about 46 grams of calcium. The first solvent sample, taken only 30 minutes after calcium nitride addition, contained essentially all of this calcium in solution, although not all of the dissolved uranium had reacted to form insoluble uranium nitride. This is similar to SPR-10 and 11. This early appearance of calcium in the zinc-magnesium-uranium solution gives even further proof that magnesium nitride is formed as an intermediate compound.

Based on the results of these four experiments, a number of conclusions were arrived at. Calcium nitride particles contained in a tantalum basket immersed in a zinc - 10 wt. percent magnesium solvent containing 1 to 1.5 wt. percent uranium react with the magnesium of the solvent to form magnesium nitride particles which are retained in the basket. The magnesium nitride particles then react with the dissolved uranium to form insoluble uranium nitride particles, which are retained in the basket with little particle disintegration. After the material retained in the basket has been retorted, it contains substantially pure uranium mononitride as the uranium product. The weight of the uranium retained in the basket plus the weight of uranium remaining in the zinc-magnesium-uranium solution account for virtually 100 percent of the weight of uranium in solution prior to calcium nitride addition. Finally, within an hour of immersion of the calcium nitride bed, essentially all of the calcium charged as calcium nitride is present in the zinc-magnesium solvent.

Although plutonium was expected to behave similarly to the uranium in the above experiments, an experiment utilizing both uranium and plutonium was run in order to insure that the results of the above and other experiments were in fact applicable to plutonium dissolved in a liquid-metal solvent as well as to uranium. In this experiment, 54 grams of calcium nitride confined in a tantalum basket were submerged in an agitated solution of zinc - 10 wt. percent magnesium containing dissolved uranium and plutonium by the same procedure as was used for the uranium solutions. This quantity of calcium nitride was 13 percent in excess of that required to react with all the dissolved plutonium and uranium to form uranium and plutonium nitrides. The temperatures, mixing rates and other parameters were similar to those of the previous experiments. Samples of the melt were taken 1, 3, 5, and 8 hours after the calcium nitride bed had been immersed in the solution.

The results from this experiment showed that after 8 hours of calcium nitride immersion, the plutonium concentration in the melt decreased from 0.18 wt. percent to 0.11 wt. percent and the uranium concentration decreased from 0.8 wt. percent to less than $1 \times 10^{-2}$ wt. percent. The nitride particle bed was about 70 percent converted to uranium nitride and plutonium nitride at the end of the experiment. It was clear from this experiment, then, that while the plutonium reacted somewhat slower than the uranium, the present invention is nevertheless applicable to the recovery of uranium, plutonium and mixtures thereof as particles of uranium nitride, plutonium nitride and uranium - plutonium nitride mixtures from a liquid-metal solvent.

Experiments SPR-13 and SPR-14 were then performed to determine the effect of a relatively high calcium content (8 and 4 wt. percent respectively) in the liquid-metal solvent on the formation of insoluble uranium nitride. Experimental conditions in these experiments were similar to those for SPR-12. In addition, the amount of calcium nitride in the bed for these two experiments was in excess of the stoichiometric amount required to completely convert the dissolved uranium to uranium mononitride. In SPR-13, a 10.75-kg liquid-metal solvent having a nominal composition of zinc - 14 wt. percent magnesium - 8 wt. percent calcium containing 1 wt. percent uranium was contacted with a 57-gram bed of calcium nitride particles for 6 hours. Filtered samples of the melt were obtained at various time intervals after the calcium nitride bed addition. Results of SPR-13 indicated that of the 79 grams of uranium originally dissolved in the liquid-metal solvent, only 9 grams of uranium solute reacted to form insoluble uranium nitride in 6 hours of contact time. In comparison, 91 grams of uranium solute reacted and was removed from the solvent in 6 hours in SPR-12. The low conversion rate of uranium solute to insoluble uranium nitride experienced in SPR-13 was attributed to the high calcium contact of the liquid-metal solvent. Calcium analysis for this experiment showed that the exchange reaction between the calcium nitride particles and the dissolved magnesium, which occurred rapidly at low calcium concentrations in previous experiments, was slowed considerably. It is theorized that the interstices in the solid particle bed became plugged, slowing down even the rapid calcium-magnesium salt-exchange reaction. The very rapid exchange reaction between particulate calcium nitride and dissolved magnesium gives a solution in the solid particle pores that has a transient calcium concentration much higher than does the bulk solvent. The high calcium content in the particle pores would result in precipitation or uranium-metal compounds in the pores due to uranium's lower solubility in high calcium concentrations, and this would essentially block liquid-metal diffusional processes in the pores of the particulate solid. Thus, uranium precipitation in the particle pores was apparently the result of concurrent high calcium and uranium concentrations in the liquid-metal solvent.

In SPR-14, a zinc-magnesium liquid-metal solvent, with the same composition as in SPR-13, except that the calcium concentration was 4 wt. percent, was used to determine whether an acceptable rate of uranium nitride formation could be achieved at this somewhat lower calcium concentration. Other conditions were the same as in SPR-13. After 6 hours of nitride bed contact, only 12 of the 97 grams of uranium initially dissolved in the liquid-metal solvent had reacted to form insoluble uranium nitride. The somewhat lower calcium concentration used in this experiment, then, did not result in a pronounced increase over the amount of uranium nitride formed in SPR-13.

One means for overcoming the problems revealed in the two above experiments would be to contact the liquid-metal solvent containing dissolved uranium and plutonium with particulate magnesium nitride rather than calcium nitride. This would enrich the solvent in magnesium and deplete it in uranium-plutonium. The liquid-metal solvent would then be removed from the nitriding vessel with the nitride bed containing the UN-PuN end product being removed and replaced with a calcium nitride bed. This latter bed would then be contacted with a magnesium-containing liquid-metal solvent depleted in uranium-plutonium, and a rapid calcium-magnesium exchange reaction to form magnesium nitride particles would take place at very low actinide concentrations, avoiding uranium-plutonium precipitation in the solid particle pores. The solution, enriched in reductant calcium after the calcium-magnesium exchange, could then be used in the next oxide reduction cycle in the head-end process with the magnesium nitride bed being used to form UN-PuN particles. Therefore, several experiments were undertaken in which magnesium nitride particles were utilized in lieu of calcium nitride particles.

Experiment SPR-15 was performed to demonstrate and determine whether, in the absence of uranium solute, calcium nitride particles can be converted to magnesium nitride particles and that the magnesium nitride is retained in the perforated basket. A further objective of this experiment was to determine whether the magnesium nitride particles so formed would subsequently react with dissolved uranium in a zinc - 12 wt. percent magnesium - 1 wt. percent calcium liquid-metal solvent containing 1 wt. percent uranium to form insoluble uranium nitride particles. Therefore, a nominal zinc - 10 wt. percent magnesium solution was contacted for 3 hours with a 57-gram bed of calcium nitride particles contained in the same tantalum basket utilized previously. Filtered samples of the melt were obtained at various intervals during the 3-hour contact period. Results of this first part of SPR-15 indicated that approximately 90 percent of the calcium was in solution 1 hour after calcium nitride addition and that essentially 100 percent was in solution after 3 hours. These results substantiate the conclusion based on previous experimental results, that the calcium in the calcium nitride particles is rapidly replaced by magnesium to form magnesium nitride particles.

After the magnesium nitride formation, the magnesium nitride bed was immersed for 5½ hours in a zinc - 12 wt. percent magnesium - 1 wt. percent calcium liquid-metal solvent containing 1 wt. percent uranium. Filtered samples of the solvent were obtained at various intervals after the basket containing the magnesium nitride particles was immersed in the solution, and these results along with those of other experiments are shown in Table III.

TABLE III

| Time after $Mg_3N_2$ Addition (hrs) | Wt. of U and Ca in solvent (g) | | | | | |
|---|---|---|---|---|---|---|
| | SPR-15 | | SPR-17 | | SPR-19 | SPR-20 |
| | U | Ca | U | Ca | U | U |
| 0 | 110 | 102 | 112 | | 882 | 769 |
| 0.25 | | | | | 799 | 680 |
| 0.50 | 82 | | 78 | | 776 | 639 |
| 0.75 | | | | | 731 | 605 |
| 1.00 | 69 | | 74 | | 731 | 606 |
| 1.50 | | | | | 748 | 605 |
| 2.00 | 53 | | 61 | | 727 | 571 |
| 3.00 | 45 | | 50 | | 673 | 583 |
| 4.00 | 38 | | | | 687 | 563 |
| 5.00 | | | 39 | | 668 | 556 |
| 5.50 | 29 | 104 | | | — | — |
| 6.00 | | | 35 | 160 | 661 | 540 |

Figure 4:
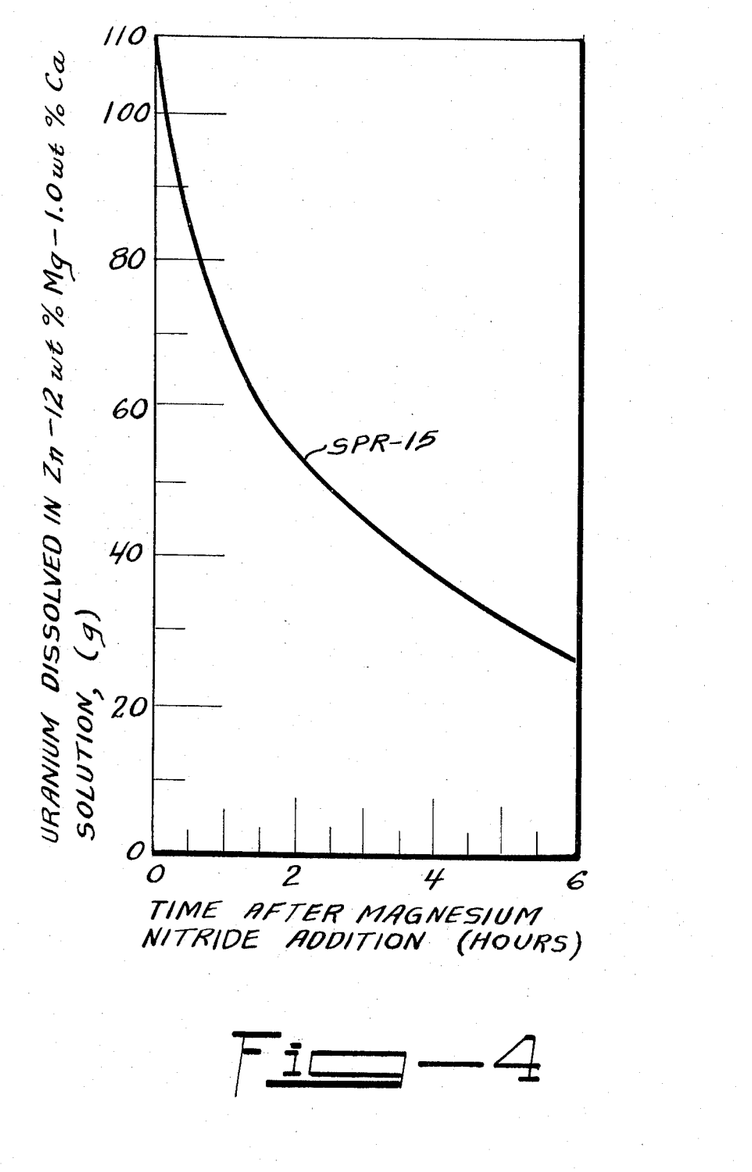
FIG. 4 is a graph showing the amount of dissolved uranium remaining in a zinc-magnesium-calcium solvent versus the time after contact of the solvent with magnesium nitride particles for another of the experimental runs of the present process.

FIG. 4 shows the relation between the weight of uranium in solution as a function of time after magnesium nitride addition for this particular experiment. As is evident from FIG. 4, the reaction rate achieved in this experiment was very acceptable for process applications.

Figure 5:
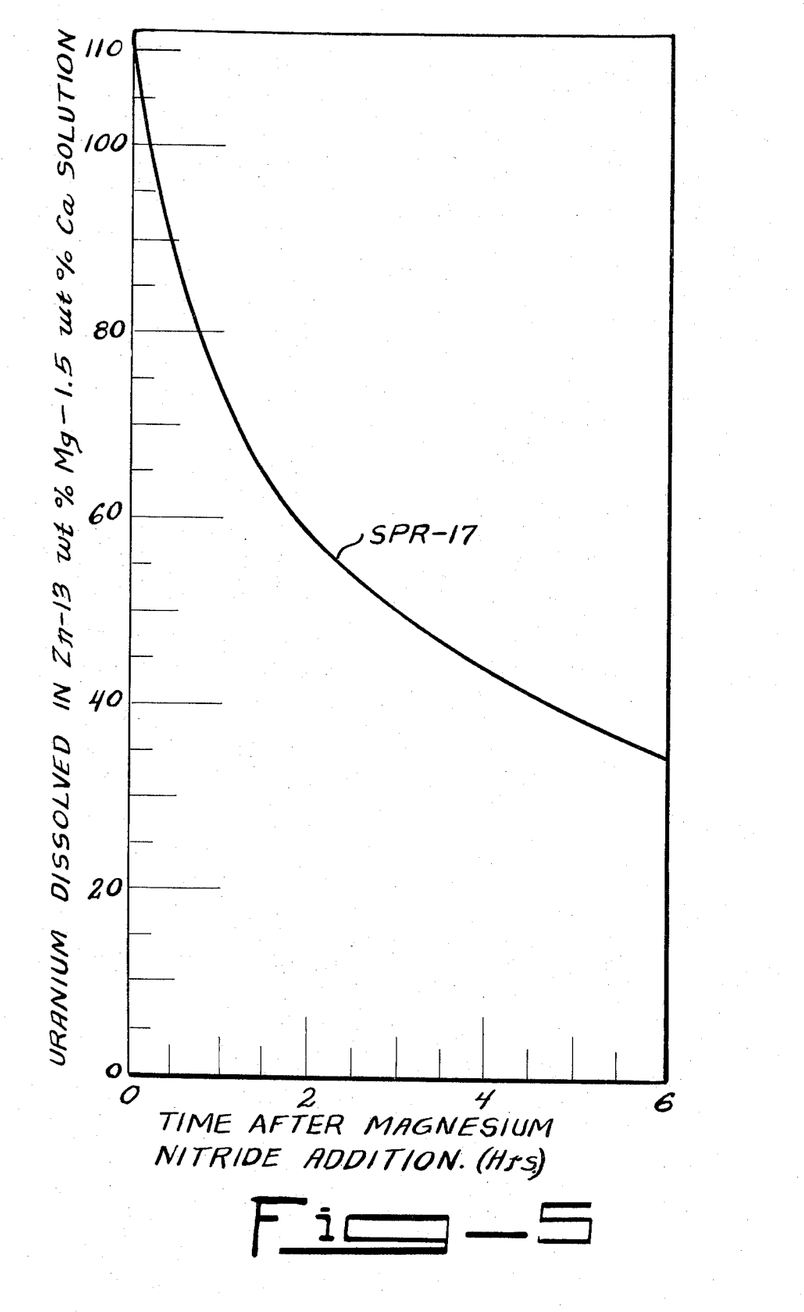
FIG. 5 is a graph showing the amount of dissolved uranium remaining in a zinc-magnesium-calcium solvent versus the time after contact of the solvent with magnesium nitride particles for another of the experimental runs of the present process.

Another experiment performed, SPR-17, was very similar to SPR-15, except that in SPR-17 the liquid-metal solvent contained 1.5 wt. percent calcium. Also, another difference between these two experiments was that, while the calcium nitride was converted to magnesium nitride in a separate step as in SPR-15, only one heat was utilized for the two steps in SPR-17 instead of two different heats for each step as in SPR-15. The results of SPR-17 were very similar to those achieved by SPR-15, and it was determined that it was basically immaterial as to whether one or two different heats were utilized. It was also determined that a calcium concentration of 1.5 wt. percent did not affect the high uranium nitride conversion rate as can be seen in FIG. 5.

Based on the above experiments, it was determined that the reaction of dissolved uranium in the liquid-metal solvent at a concentration of about 1 wt. percent with a bed of calcium nitride particles to form insoluble uranium nitride within the bed is inhibited by a high calcium concentration in the liquid-metal solvent. At calcium concentrations of 4 wt. percent with 1 wt. percent uranium present in the solvent, the reaction is slower than desirable for process applications. However, with calcium concentrations of less than 4 wt. percent, the reaction has been demonstrated to proceed quite well with 1.0 to 1.5 wt. percent calcium producing a preferred rate. In addition, while a bed of calcium nitride particles can be directly immersed in the liquid-metal solvent containing uranium and plutonium to form uranium nitride and plutonium nitride particles through the formation of the intermediate magnesium nitride and thereby recover the uranium and plutonium from the liquid-metal solvent, it is preferred that the calcium nitride particles first be separately converted to magnesium nitride particles which are then contacted with the uranium-plutonium-containing liquid-metal solvent, or that magnesium nitride particles just be utilized initially. By this process for uranium and plutonium product recovery, then, the uranium content in the liquid-metal solvent can be reduced to 0.05 wt. percent or less.

Finally, several other experiments were run to determine various other parameters of the present invention. SPR-18 indicated that the formation of magnesium nitride particles from calcium nitride particles is not retarded by a calcium concentration as high as 4.5 wt. percent in the solvent metal. Therefore, either the calcium nitride particles can be introduced into the liquid-metal solvent containing magnesium prior to uranium and plutonium dissolution therein so as to convert the particles to magnesium nitride particles followed, then, by the dissolution of the uranium and plutonium in the solvent, or the calcium nitride particles can be converted to magnesium nitride particles in an entirely different step. In SPR-19, the uranium concentration in the liquid-metal solvent was increased considerably. A 113-gram bed of calcium nitride particles was first converted to magnesium nitride particles by contact for 5 hours with a zinc - 10 wt. percent magnesium - 4.2 wt. percent calcium solution. The magnesium nitride bed was then immersed in 12.89 kg of a nominal zinc - 10 wt. percent magnesium - 1 wt. percent calcium solution containing 7 wt. percent uranium. This was a sevenfold increase in uranium concentration which approximated the expected 5 to 10 wt. percent uranium concentration in the liquid-metal solvent of a commercial-scale pyrochemical head-end process. The purpose of SPR-19 was to determine whether any problems might be encountered in converting magnesium nitride particles to insoluble uranium nitride particles by reaction with uranium solute present in high concentration in the liquid-metal solvent. The results of this experiment can be found in Table III. As can be seen from these results, the reaction rate is somewhat slower than the rate in the experiments which had a lower uranium concentration in the liquid-metal solvent. It is believed that this slower reaction rate was due to inadequate contact of the uranium solute with the magnesium nitride bed, for the same agitation speed was used in SPR-19 as in the previous experiments while both the weight and volume of the magnesium nitride bed were about twice as great as those used previously.

Due to the results achieved with SPR-19, experiment SPR-20 was performed and was similar to SPR-19 except that an agitation speed of 720 rpm and a nominal uranium concentration of only 6 wt. percent were utilized. Other than these changes, the conditions of this experiment were similar to those of SPR-19. From the results shown in Table III, it can be seen that the reaction rates for the first 0.75 hour of contact were quite good. After this initial period, the reaction rate leveled off at about 50 to 60 percent conversion of the magnesium nitride to uranium mononitride and closely approximates the results of SPR-19. These results indicate that a change in the reaction mechanism occurred at about 50 percent conversion of the nitrogen charged as magnesium nitride. While this conversion rate would be marginally adequate for a commercial-scale application of the present invention, much higher rates are obtainable, in view of the previous experiments, even with high uranium-plutonium concentrations, although adjustments to some variables such as agitation speed, bed size and location and particle size will be necessary.

SPR-21 was performed to determine whether uranium dissolved in a zinc-calcium liquid-metal solvent without magnesium would react directly with a bed of calcium nitride particles to form insoluble uranium nitride, formation of the intermediate magnesium nitride being impossible. The procedure used for this experiment was similar to that of SPR-12. 57 grams of calcium nitride particles were immersed in a zinc - 10.5 wt. percent calcium solvent containing 0.9 wt. percent uranium. Of the 86 grams of uranium originally present in the solvent, 77 grams of uranium remained in the solvent at the end of the 6-hour contact period. Thus, only about 9 grams of uranium solute reacted to form insoluble uranium nitride as compared with the 91 grams of uranium solute that reacted during an equivalent contact period in SPR-12, in which a nominal zinc - 10 wt. percent magnesium - 1 wt. percent uranium solution was used. There are two possible explanations for the low conversion of uranium solute to uranium nitride. The first explanation is that the activity coefficient of uranium may be much lower in a zinc-calcium solution than in a zinc-magnesium solution. The second explanation is that the rate of the reaction of dissolved uranium with calcium nitride in the absence of magnesium to form an intermediate may be slower than it is with magnesium nitride. Therefore, while the use of calcium nitride is within the scope of the present invention, it is preferred to utilize magnesium nitride particles either directly or converted from calcium nitride particles.

Based on the results of the above experiments, the conversion of uranium and plutonium dissolved in a liquid-metal solvent to insoluble nitrides by reaction with calcium nitride particles contained in a perforated basket has been demonstrated at a rate acceptable for commercial-scale process applications provided that magnesium is present in the liquid-metal solvent to form the intermediate compound, magnesium nitride, and that the calcium concentration of the liquid-metal solvent is less than 4 wt. percent during the uranium-plutonium nitride formation step. In the experiments in which the above two conditions were not met, uranium was recovered from the solvent by the formation of uranium nitride, but the rate of conversion of dissolved uranium to uranium nitride was not as high as desired for large commercial-scale process applications, although such conversion nevertheless did proceed. In addition, it need not be necessary in order to achieve preferred conversion rates for commercial-scale application to include magnesium in the liquid-metal solvent if magnesium nitride particles are utilized in lieu of calcium nitride particles, nor need it be necessary to limit the calcium concentration in the liquid-metal solvent in such a case.

Figure 6:
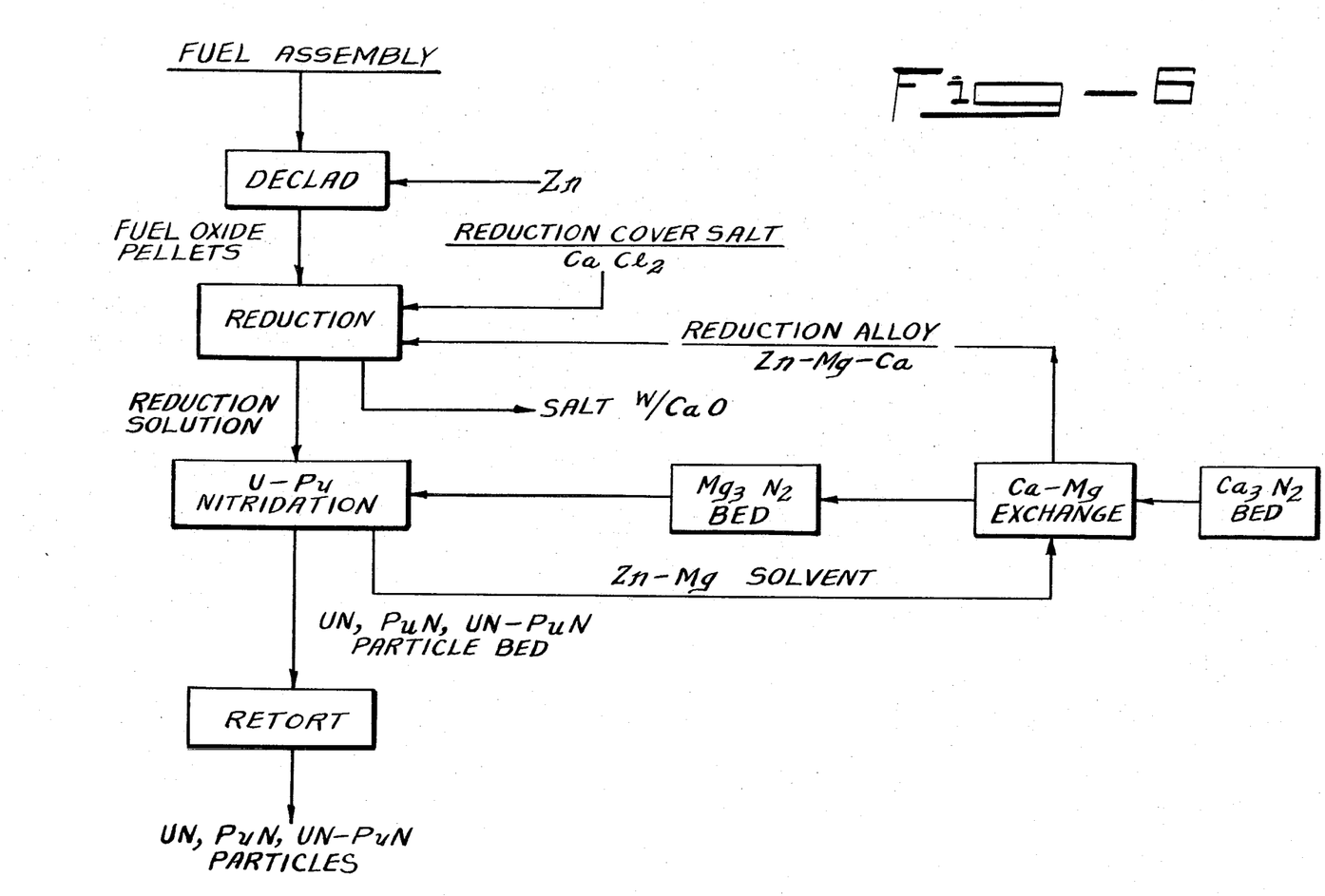
FIG. 6 is a flow chart of the head-end process illustrating one specific embodiment of the present invention.

Turning now to FIG. 6, a more detailed flow chart incorporating one particular embodiment of the present invention in the pyrochemical head-end process is shown. As with FIG. 2, only those portions of the process which help illustrate the present invention are shown. In this particular scheme, a liquid zinc-magnesium-calcium reduction alloy is utilized to reduce the fuel oxides after decladding. Therefore, a bed of calcium nitride particles in accordance with the teachings herein is contacted with a molten zinc-magnesium solution whereupon the calcium is replaced by magnesium, leaving a bed of magnesium nitride particles immersed in a solution of liquid zinc-magnesium-calcium. The bed is then removed, and the zinc-magnesium-calcium solution is utilized as the liquid-metal reduction alloy in the reduction step of the head-end process. The magnesium nitride bed is then in turn utilized in the plutonium-uranium nitridation process of the present invention. After this nitridation process, the resultant solution contains zinc and magnesium and, with appropriate adjustments made thereto, can then be recycled for contact with a second calcium nitride bed. The converted nitride bed after the nitridation process is, in accordance with the present invention, then retorted so as to result in particles of uranium nitride, plutonium nitride and uranium - plutonium nitride mixtures.

As can be seen from the above description, the present invention affords a simple yet efficient method for recovering uranium and plutonium from spent LMFBR fuel assemblies in a pyrochemical fuel reprocessing system by utilizing a bed of calcium nitride or magnesium nitride particles in contact with a liquid-metal solvent, such as zinc-magnesium or zinc-magnesium-calcium, containing the dissolved uranium and plutonium metals.

In addition to utilizing the present invention for separating uranium and plutonium from irradiated fuel assemblies, the present process may also be utilized for preparing UN, PuN and UN-PuN nuclear reactor fuels. In accordance with the above teachings, uncontaminated uranium and/or plutonium is dissolved in a liquid-metal solvent such as molten zinc, zinc-magnesium or zinc-magnesium-calcium, the solvent being agitated and maintained at approximately 750°-850°C. A bed of calcium nitride or magnesium nitride particles is then immersed in the above solvent for an effective period of time, with magnesium nitride immersed for about 6 hours being preferred. During this immersion period, the nitride particles are converted to particles of uranium mononitride, plutonium mononitride and/or mixtures thereof in accordance with the above disclosure. After this immersion period, the converted particle bed is removed from the liquid-metal solvent and then retorted at about 925°C. to remove any remaining solvent as well as to volatilize any unreacted calcium nitride or magnesium nitride. This results in particles of substantially pure uranium mononitride and/or uranium - plutonium mononitride mixtures which may then be utilized as nuclear reactor nitride fuel.

It will be understood that the present invention is not to be limited to the details given herein but that it may be modified within the scope of the appended claims.

The embodiments of the invention in which an exclusive property or privilege is claimed are defined as follows:

1. A process for recovering uranium and plutonium from irradiated nuclear fuel oxide comprising reducing said fuel oxide to uranium and plutonium metal by contacting said fuel oxide with a liquid-metal reducing solvent, said uranium and plutonium metal being dissolved therein; contacting said liquid-metal solvent with particulate calcium nitride or magnesium nitride to react said dissolved uranium and plutonium with the particulate nitride to form insoluble particles of uranium nitride, plutonium nitride and uranium - plutonium nitride mixtures; separating said insoluble particles from said liquid-metal solvent; and volatilizing any unreacted calcium nitride or magnesium nitride, thereby recovering said uranium and plutonium in the form of particulate uranium nitride, plutonium nitride and uranium - plutonium nitride mixtures.

2. The process according to claim 1 wherein said liquid-metal reducing solvent is a mixture of zinc, magnesium and calcium, and wherein said liquid-metal reducing solvent is contacted with particulate calcium nitride whereby said calcium nitride reacts with said magnesium to form particulate magnesium nitride which subsequently reacts with said dissolved uranium and plutonium to form insoluble particles of uranium nitride, plutonium nitride and uranium - plutonium nitride mixtures.

3. The process according to claim 1 wherein said liquid-metal solvent is contacted with particulate magnesium nitride, and wherein said particulate magnesium nitride is formed by contacting particulate calcium nitride with a molten zinc-magnesium melt, said calcium nitride reacting with the magnesium in said melt to form magnesium nitride.

4. The process according to claim 1 wherein said particulate calcium nitride or magnesium nitride is in the form of a particle bed contained in a perforated container separately removable from said liquid-metal solvent.

5. A process for recovering uranium and plutonium from irradiated nuclear fuel oxide comprising contacting a molten zinc-magnesium solvent with a bed of particulate calcium nitride to react said calcium nitride with said magnesium to form a bed of particulate magnesium nitride, the calcium dissolving in said solvent so as to form a molten zinc-magnesium-calcium solvent; removing the bed of particulate magnesium nitride from said zinc-magnesium-calcium solvent; contacting said fuel oxide with said molten zinc-magnesium-calcium solvent to reduce said fuel oxide to dissolved uranium and plutonium metal and calcium oxide; contacting said molten solvent containing the dissolved uranium and plutonium metal with said bed of particulate magnesium nitride to react said uranium and plutonium with said magnesium nitride to form a bed of insoluble particles of uranium nitride, plutonium nitride and uranium - plutonium nitride mixtures; removing said bed of insoluble particles from said molten solvent; and volatilizing any unreacted calcium nitride or magnesium nitride, thereby recovering said uranium and plutonium in the form of particulate uranium nitride, plutonium nitride and uranium - plutonium nitride mixtures.

6. The process according to claim 5 wherein said bed of particulate calcium nitride is maintained in contact with said molten zinc-magnesium solvent for at least 1 hour, said solvent being continuously agitated at a temperature of about 750°–800°C.

7. The process according to claim 6 wherein said bed of particulate magnesium nitride is maintained in contact with said molten zinc-magnesium-calcium solvent for at least 6 hours, said solvent being continuously agitated at a temperature of about 750°–800°C.

8. A process for recovering uranium and plutonium from irradiated nuclear fuel oxide comprising contacting said fuel oxide with a molten zinc-magnesium-calcium solvent to reduce said fuel oxide to dissolved uranium and plutonium metal and calcium oxide; contacting said molten solvent containing the dissolved uranium and plutonium metal with a bed of particulate calcium nitride to react said uranium and plutonium with the bed of particulate nitride to form a bed of insoluble particles of uranium nitride, plutonium nitride and uranium - plutonium nitride mixtures, the calcium nitride reacting with the magnesium in said molten solvent to form particulate magnesium nitride which subsequently reacts with said uranium and plutonium to form said bed of insoluble particles; removing said bed of insoluble particles from said molten solvent; and volatilizing any unreacted calcium nitride or magnesium nitride, thereby recovering said uranium and plutonium in the form of particulate uranium nitride, plutonium nitride and uranium - plutonium nitride mixtures.

9. The process according to claim 8 wherein said bed of particulate calcium nitride is maintained in contact with said molten zinc-magnesium-calcium solvent for at least 6 hours, said solvent being continuously agitated at a temperature of about 750°–800°C.

10. The process according to claim 9 wherein said zinc-magnesium-calcium solvent contains less than 4 weight percent calcium when in contact with said bed of particulate calcium nitride.

11. In a pyrochemical process for reprocessing irradiated nuclear fuel assemblies containing uranium and plutonium oxides comprising decladding said assemblies in a molten metal, separating the uranium and plutonium oxides therefrom, contacting said oxides with a liquid-metal reducing solvent containing zinc and magnesium to reduce said oxides to uranium and plutonium metal dissolved therein, and recovering said dissolved uranium and plutonium metal from said liquid-metal reducing solvent, the improvement therein comprising contacting said liquid-metal reducing solvent containing dissolved uranium and plutonium metal with particulate calcium nitride or magnesium nitride to react said uranium and plutonium with the particulate nitride to form insoluble particles of uranium nitride, plutonium nitride and uranium - plutonium nitride mixtures; separating said insoluble particles from said liquid-metal reducing solvent; and volatilizing any unreacted calcium nitride or magnesium nitride, thereby recovering said uranium and plutonium in the form of particulate uranium nitride, plutonium nitride and uranium - plutonium nitride mixtures.

12. The improvement according to claim 11 wherein said particulate calcium nitride or magnesium nitride is in the form of a particle bed contained in a perforated container separately removable from said liquid-metal solvent.

13. A process for preparing uranium mononitride, plutonium mononitride or mixed uranium - plutonium mononitride nuclear reactor fuels comprising dissolving substantially pure uranium, plutonium or mixtures thereof in a molten metal solvent; contacting said molten metal solvent with particulate calcium nitride or magnesium nitride to react said uranium, plutonium or mixtures thereof with the particulate nitride to form insoluble particles or uranium mononitride, plutonium mononitride or uranium - plutonium mononitride mixtures; separating said insoluble particles from said molten metal solvent; and volatilizing any unreacted calcium nitride or magnesium nitride, resulting thereby in substantially pure particles of uranium mononitride, plutonium mononitride or uranium - plutonium mononitride mixtures for use as fuel in nuclear reactors.

14. The process according to claim 13 wherein said particulate calcium nitride or magnesium nitride is in the form of a particle bed contained in a perforated container separately removable from said molten metal solvent.

* * * * *